United States Patent [19]

Baversten

[11] Patent Number: 5,170,899
[45] Date of Patent: Dec. 15, 1992

[54] WATERPROOF COVER FOR CRANE HOOK

[75] Inventor: Bengt I. Baversten, Simsbury, Conn.

[73] Assignee: Combustion Engineering, Inc., Windsor, Conn.

[21] Appl. No.: 820,814

[22] Filed: Jan. 15, 1992

[51] Int. Cl.⁵ .............................................. B66C 11/00
[52] U.S. Cl. .................................. 212/221; 376/260; 376/292; 294/131
[58] Field of Search .............. 376/287, 292, 260, 264, 376/271, 203, 262; 212/266, 220, 221; 294/131, 82.1, 906; 414/146

[56] References Cited

U.S. PATENT DOCUMENTS 4,259,153  3/1981  Pryamilov et al. ................ 376/262
4,713,210 12/1987  Germer ............................. 376/262

Primary Examiner—Daniel D. Wasil
Attorney, Agent, or Firm—John H. Mulholland

[57] ABSTRACT

A watertight cover for the hook, hook block and cables of a crane comprises a hook box, of a size to receive the hook, fixed to a first cover member, which is of a size to receive the hook block. A second cover member is telescopically carried on the first cover member. Remotely controlled means are provided for displacing the second cover, relative to the first cover, as the hook is lowered into the water.

8 Claims, 1 Drawing Sheet

WATERPROOF COVER FOR CRANE HOOK

BACKGROUND AND SUMMARY OF THE INVENTION

The present invention pertains to cranes and, more particularly, to cranes used in the manipulation of equipment submerged in the water of a boiling water nuclear reactor (BWR).

Movement of equipment and components of a boiling water reactor is accomplished by the use of a heavy-duty overhead crane which comprises a part of the reactor system. Due to the limited space available within the pressure vessel and the geometry of the pool within which the loads are located, it may sometimes be necessary to lower the crane hook below the water surface. Because the water is radioactive, it is undesirable to wet the crane hook, hook block or cables therein, as they must then be thoroughly washed or otherwise decontaminated before they may be used again.

It is, therefore, a primary object of the present invention to provide a watertight cover for a crane hook, hook block and cables which does not interfere with the crane operation.

The foregoing and other objects and advantages are achieved by a watertight cover comprising a hook box, of a size to receive the hook, sealingly joined to a first cover member, which is of a size to receive the hook block. A second cover member is telescopically carried on the first cover member. Remotely controlled means are provided for displacing the second cover member, relative to the first cover member, as the hook is lowered into the water.

Advantageously, the hook box is integrally formed with a load-supporting strongback. Likewise, the first cover member may be integrally formed with the hook.

BRIEF DESCRIPTION OF THE DRAWING

The single FIGURE is a cross-sectional view of a crane hook, having a waterproof cover in accord with the present invention, in use.

DESCRIPTION OF THE PREFERRED EMBODIMENT

Figure 1:
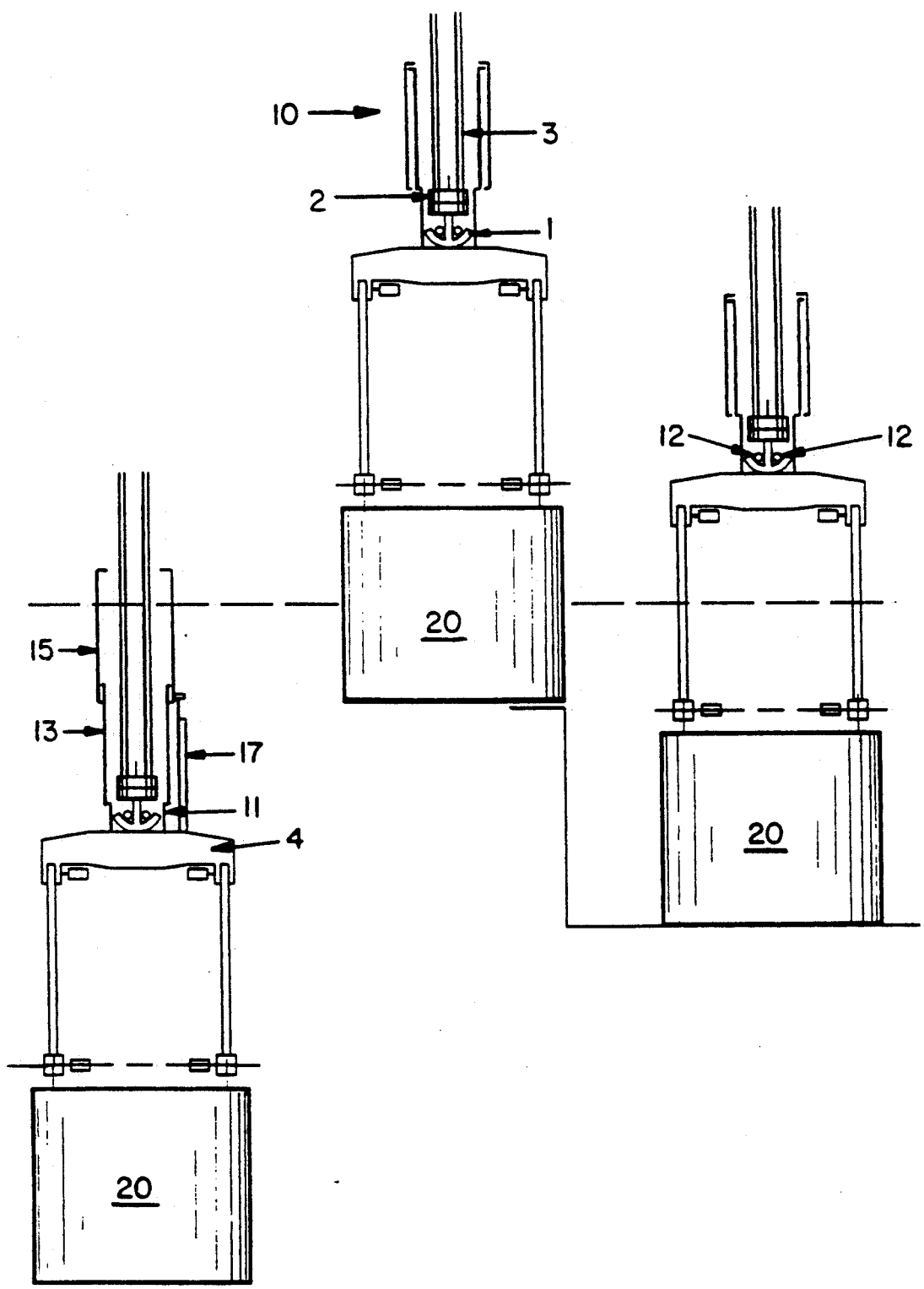

Turning now to the drawing, there is shown a waterproof cover 10 installed on conventional crane hook 1, hook block 2 and cables 3 of the type commonly associated with the overhead traveling crane (not shown) of a boiling water reactor. Cover 10 comprises a hook box 11 and first and second cover members 13 and 15, respectively.

Hook box 11, which is of a size to receive hook 1, is removably secured thereto by two parallel, transversely disposed pins 12. Hook box 11 is engageable with a load to be handled by the crane. For purposes of illustration, hook box 11 is shown in association with a conventional strongback 4, which may be integrally formed therewith.

First cover member 13, which is of a size to receive hook block 2, sits atop hook box 11, to which it is fixed in a watertight manner. Alternatively, hook box 11 and first cover member 13 may be integrally formed.

Second cover member 15 is telescopically carried on first cover member 13, in watertight engagement therewith. Both first and second cover members 13 and 15 are right cylinders, advantageously right circular cylinders.

A remotely controlled displacement device 17 is attached to strongback 4 and engages second cover member 15 for displacement between an extended position (seen in the left hand portion of the drawing) and a retracted position (seen in the center and right hand portions of the drawing) wherein it substantially overlies first cover member 13. Displacement device 17 may comprise any of a variety of conventional actuators, such as a hydraulic or pneumatic cylinder, or an electric motor with threaded output shaft and nonrotating nut.

In the drawing, watertight hook box 10 is shown in use within the pressure vessel of a boiling water reactor. In particular, a steam separator 20 is being moved from the separator pool floor, over the threshold, to the reactor cavity. It will be appreciated that this problem is complicated by the comparatively low maximum travel height of the overhead crane and the desire to avoid wetting crane hook 1, hook block 2 and cables 3.

With steam separator 20 resting in the separator pool floor (see right hand portion of the drawing), hook 1 is above the level of the water in the reactor cavity and second cover member 15 is in its retracted position. After being lifted to pass over the threshold (see center portion of the drawing), separator 20 is lowered into the reactor cavity. As hook 1 is lowered, displacement device 17 is activated to raise second cover member 15 to its extended position (see left portion of the drawing). Throughout this operation, hook 1, hook block 2 and cables 3 have been kept from contact with the water.

Although the invention has been described by reference to a preferred embodiment, it is to be understood that various changes and modifications may be effected without departing from the spirit and contemplation of the invention which is intended to be limited in scope only by the appended claims.

I claim:

1. A watertight cover for the hook, hook block and cables of a crane comprising:
   a hook box, of a size to receive the crane hook, engageable with a load;
   a first cover member, of a size to receive the hook block, engaged in watertight relation with said hook box;
   a second cover member telescopically carried on said first cover member and in watertight engagement therewith; and
   remotely controlled displacement means for displacing said second cover member relative to said first cover member.

2. The watertight cover of claim 1, wherein said hook box includes at least one pin engageable with the crane hook.

3. The watertight cover of claim 1, wherein said hook box includes a load-supporting strongback.

4. The watertight cover of claim 3, wherein said displacement means engages both said second cover member and said strongback.

5. The watertight cover of claim 1, wherein both said first and second cover members are right cylinders.

6. The watertight cover of claim 5, wherein both said first and second cover members are circular cylinders.

7. The watertight cover of claim 2, wherein said hook box includes a pair of pins, disposed in substantially parallel relation, engageable with the crane hook.

8. The watertight cover of claim 1, wherein said hook box is integrally formed with first cover member.

* * * * *